United States Patent [19]

Reip

[11] Patent Number: 4,791,955

[45] Date of Patent: * Dec. 20, 1988

[54] MODULATING PRESSURE OPERATED PILOT RELIEF VALVE

[75] Inventor: Raymond G. Reip, Cook, Ill.

[73] Assignee: Dresser Industries, Inc., Dallas, Tex.

[ * ] Notice: The portion of the term of this patent subsequent to Oct. 7, 2003 has been disclaimed.

[21] Appl. No.: 864,665

[22] Filed: May 19, 1986

Related U.S. Application Data

[63] Continuation of Ser. No. 534,594, Sep. 22, 1983, Pat. No. 4,615,356.

[51] Int. Cl.$^4$ ............................................. G05D 16/00
[52] U.S. Cl. ..................................... 137/488; 137/492
[58] Field of Search ............ 137/488, 489, 492, 492.5

[56] References Cited

U.S. PATENT DOCUMENTS

| | | | |
|---|---|---|---|
| 2,849,987 | 9/1958 | Shafer | 137/488 X |
| 2,877,791 | 3/1959 | Rich | 137/488 X |
| 3,083,726 | 4/1963 | Woelfel | 137/488 X |
| 4,129,141 | 12/1978 | Vogeli | 137/488 X |
| 4,384,590 | 5/1983 | Friend | 137/102 |
| 4,615,356 | 2/1986 | Reip | 137/488 |

*Primary Examiner*—Alan Cohan

[57] ABSTRACT

A main valve includes a product pressure inlet, an outlet, a movable closure member and a pressurized head volume above the closure member. Product pressure relief flow through the main valve is controlled by a modulating, pressure operated pilot relief valve that includes a piston chamber with a reciprocally mounted pilot piston. The chamber is in fluid communication with the pressurized head volume and with the outlet and inlet of the main valve. An inlet valve controls flow from the inlet of the main valve into the chamber and is actuated by the pilot piston. A vent valve is mounted within the piston chamber and controls fluid flow from the piston chamber to the outlet of the main valve and is actuated by the pilot piston. The pilot piston includes first and second surfaces and effective areas exposed to the pressure in the piston chamber and an end isolated from the piston chamber and in fluid communication with the main valve inlet. A field test valve is also included with an inlet for the introduction of test pressure. The test valve includes a first outlet in fluid communication with the inlet and a poppet valve mounted between the inlet and first outlet. The field test valve further includes a second outlet in fluid communication with the field test inlet and the inlet of the main valve. A shuttle valve is positioned within the test valve between the field test valve inlet and second outlet.

7 Claims, 6 Drawing Sheets

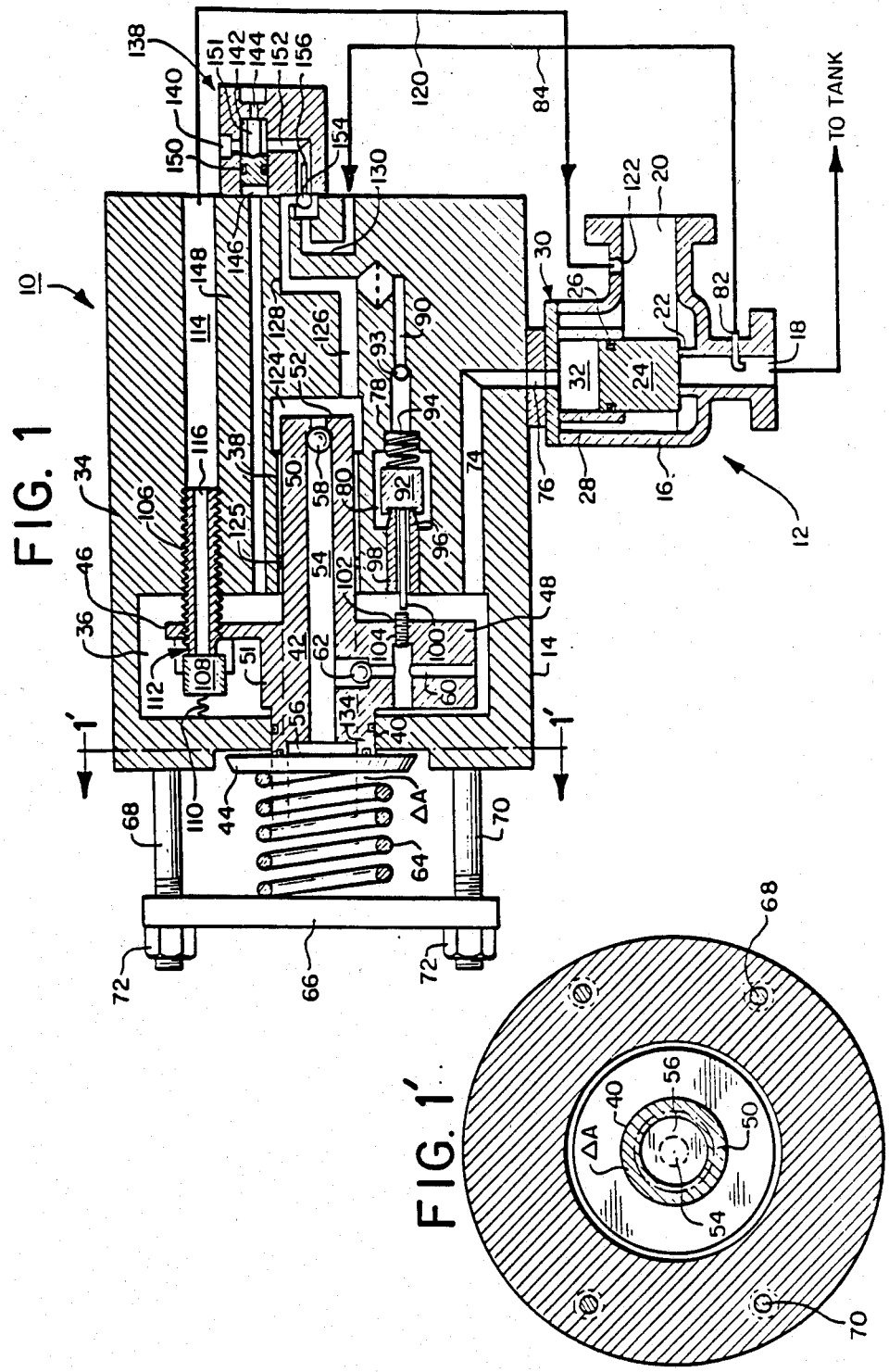

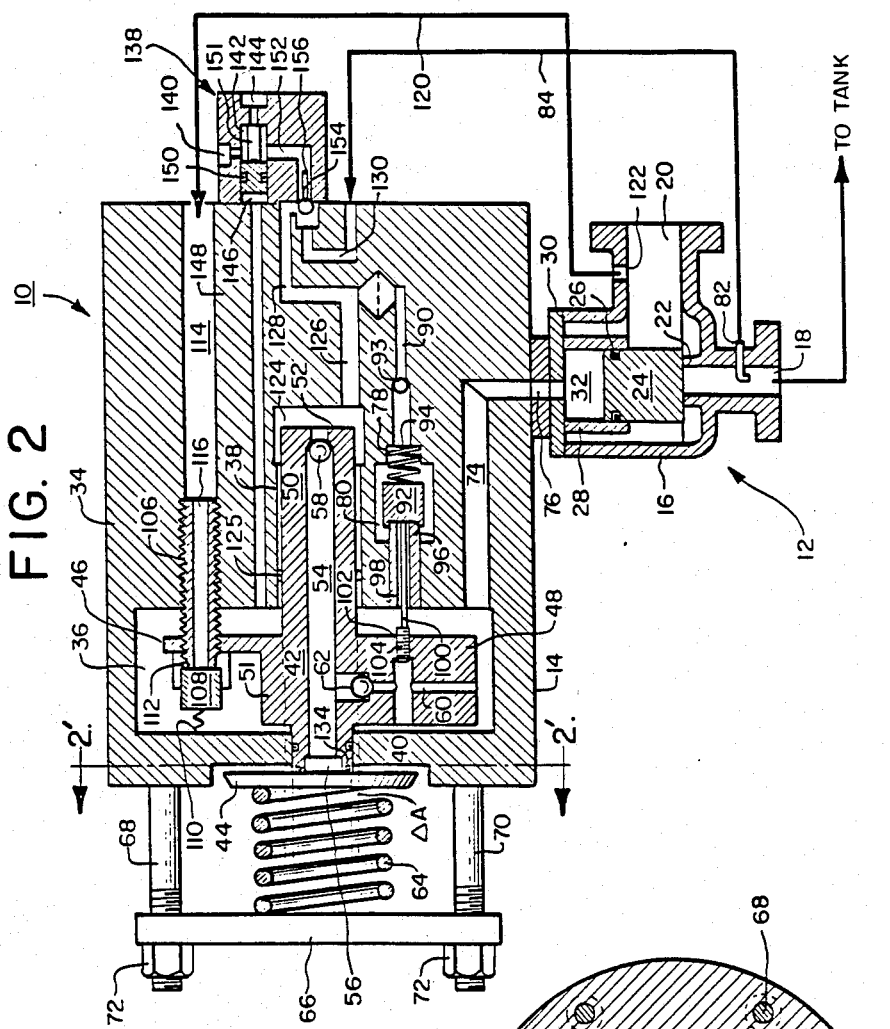
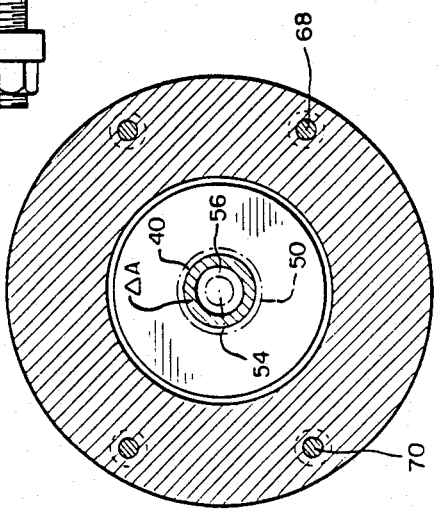

MODULATING PRESSURE OPERATED PILOT RELIEF VALVE

This application is a continuation of U.S. patent application Ser. No. 534,594, filed Sept. 22, 1983 and now U.S. Pat. No. 4,615,356, issued Oct. 7, 1986.

BACKGROUND OF THE INVENTION

1. Field of the Invention

The present invention relates to a new and improved modulating pilot valve for adjusting product pressure relief flow from a balanced main valve.

2. Cross Reference to Related Applications

My U.S. Pat. No. 4,402,341, filed on Apr. 6, 1981, for Pilot Operated Relief Valve, is hereby incorporated by reference.

3. Description of the Background Art

It is desirable to secure a safety or pressure relief valve on a pressure vessel for venting product pressure that exceeds a limit above which a dangerous condition may result. A typical safety valve includes a valve member biased by a spring into engagement with a seat. If product pressure exceeds a predetermined safe level, the force against the valve exceeds the biasing force of the spring causing the valve to lift from the seat to vent product pressure. Such valves are unreliable and subject to rapid deterioration due to repeated engagement with the valve seat. Since the valve and seat are in the flow of product fluid, damage from the impinging flow also occurs. Safety valves incorporating a pilot valve have also been employed. Also valves now in use operate by continuously bleeding the product from the main valve resulting in substantial loss of product. In addition, continuous pilot fluid flow or bleed through the pilot valve increases the probability that debris entrained in the fluid may obstruct the pilot valve.

A known safety valve for a pressure vessel is illustrated in U.S. Pat. No. 4,291,721. The valve disclosed in this patent does not provide modulating action, and the extended construction utilized increases the possibility of malfunction by sticking of close fitting sliding parts.

All of the existing valves as described are difficult to test, i.e. to make a field determination of pilot valve operating pressure when installed on a pressure vessel or conduit. With these valves, testing generally requires venting of a substantial volume of product fluid.

SUMMARY OF THE INVENTION

An object of the present invention is to provide a new and improved modulating, pressure actuated pilot operated relief valve.

Another object of the present invention is to provide a new and improved modulating pressure actuated pilot operated relief valve that relieves excess product pressure in a vessel by venting pressurized head volume above a balanced main valve member in proportion to the excess without allowing continuous flow through the pilot.

A further object of the present invention is to provide a new and improved pressure actuated pilot operated relief valve that includes a field test valve allowing testing of the pilot valve without venting of product pressure or disassembly of the valve.

It is an additional object of the present invention to provide a new and improved pilot for operating a main valve in pressure relief having secondary or backup operation in case of pilot valve failure, and field test valve wherein the backup relief and field test valve are automatically set to a predetermined operating pressure by initial adjustment of the pilot valve.

A still further object of the present invention is to provide a new and improved pressure actuated pilot operated relief valve with an automatically set back up, quick relief or popoff device which will cause the valve to open at a predetermined overpressure if the valve fails to operate normally.

Briefly, the present invention is directed to a new and improved pressure actuated pilot operated relief valve for continuous modulation of the flow of product pressure from a vessel. The pilot valve communicates with a balanced main valve that includes a movable closure member and a pressurized head volume above the closure member. The pilot valve includes a pilot piston chamber and a differential pilot piston reciprocally mounted within the chamber. The chamber is in fluid communication with the pressure in the head volume that acts on the pilot piston to bias the piston in a selected direction due to the differential area of the piston. Product pressure is communicated to an inlet valve that is actuated by the pilot piston to allow flow of product pressure into the chamber. The pilot piston chamber is communicated to the outlet of the main valve through a vent valve that is actuable by the pilot piston.

A field test valve is included with an inlet to which test pressure may be applied. A first outlet is defined in the field test valve in fluid communication with the field test inlet. A poppet valve is mounted between the first inlet and the first outlet to control flow of fluid therebetween. A vent orifice is included with flow therethrough controlled by the poppet valve. The field test valve includes a second outlet in fluid communication with the field test inlet and with product pressure. A shuttle valve is positioned between the second outlet and the field test inlet to control fluid therethrough. The pilot piston includes a head member loaded by the same spring as the pilot piston but is free to move independently and open the main valve providing backup relief.

BRIEF DESCRIPTION OF THE DRAWINGS

The above and other objects and advantages and novel features of the present invention will become apparent from the following detailed description of the preferred embodiment of the invention illustrated in the accompanying drawings wherein:

FIG. 1 is a schematic illustration of a modulating, pressure actuated pilot operated relief valve constructed in accordance with the principles of the present invention; and FIG. 1 - 1' is a section through the pilot valve of FIG. 1 particularly showing the differential pressure area of the operating piston of the modulating version of the pilot valve of the invention.

FIG. 2 is a schematic illustration similar to FIG. 1 of an alternative embodiment of a pop or rapidly acting full discharge pilot operated relief valve.

FIG. 2 - 2' is a section view of the pilot valve of FIG. 2 particularly showing the differential pressure areas on the piston of the "pop" or instantaneously operating version of the pilot valve of the invention.

FIG. 8 is a section along lines 8—8 of FIG. 7, particularly showing shape and positioning of pilot internal poppet valves.

FIG. 9 is a section taken along lines 8—8 of FIG. 7, particularly showing the relationship of the internal poppet valves and operating piston.

DESCRIPTION OF THE PREFERRED EMBODIMENT

Figure 3:
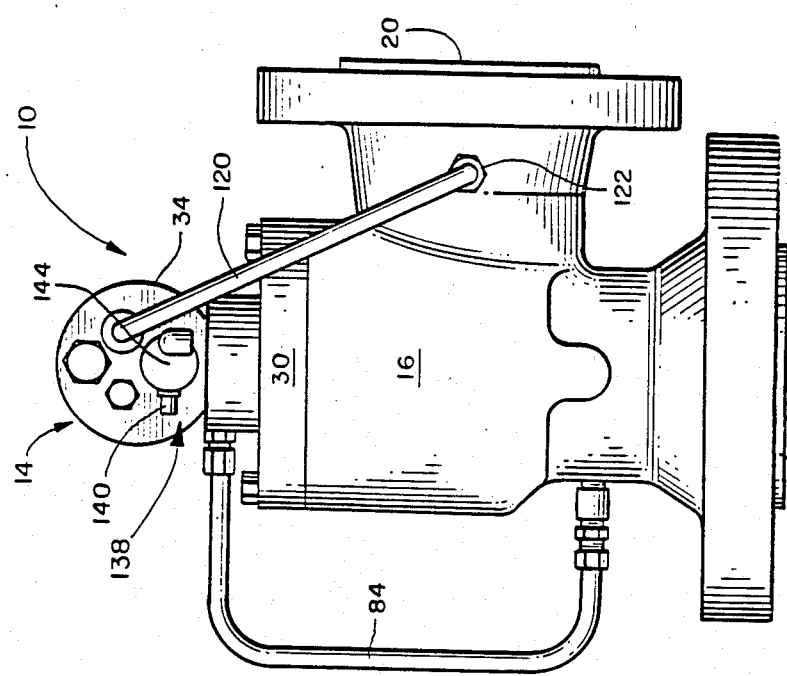
FIG. 3 is a plan or side view of the pilot valve of the invention particularly showing interconnecting conduits between the pilot main valve, and field test valve.
Figure 4:
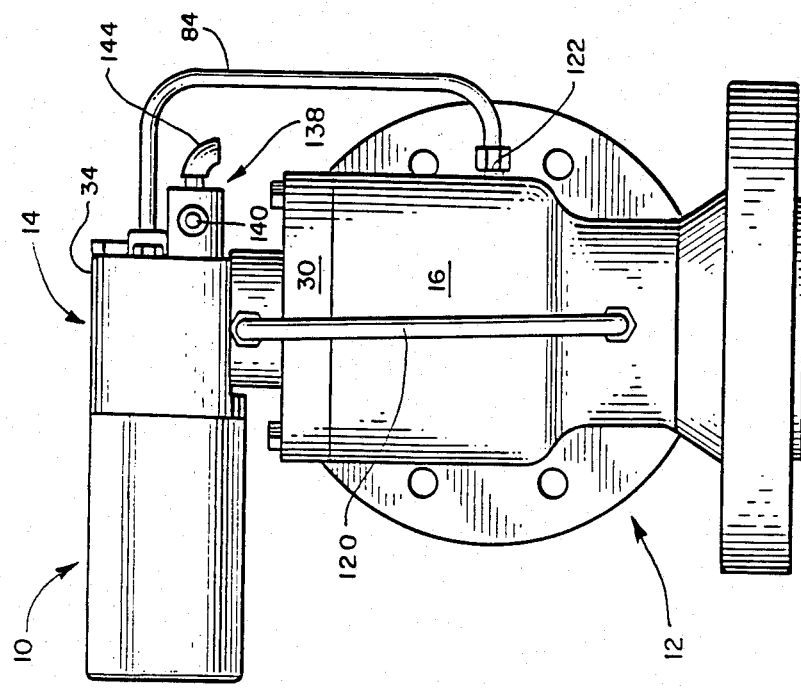
FIG. 4 is an additional plan or side view similar to FIG. 3.
Figure 5:
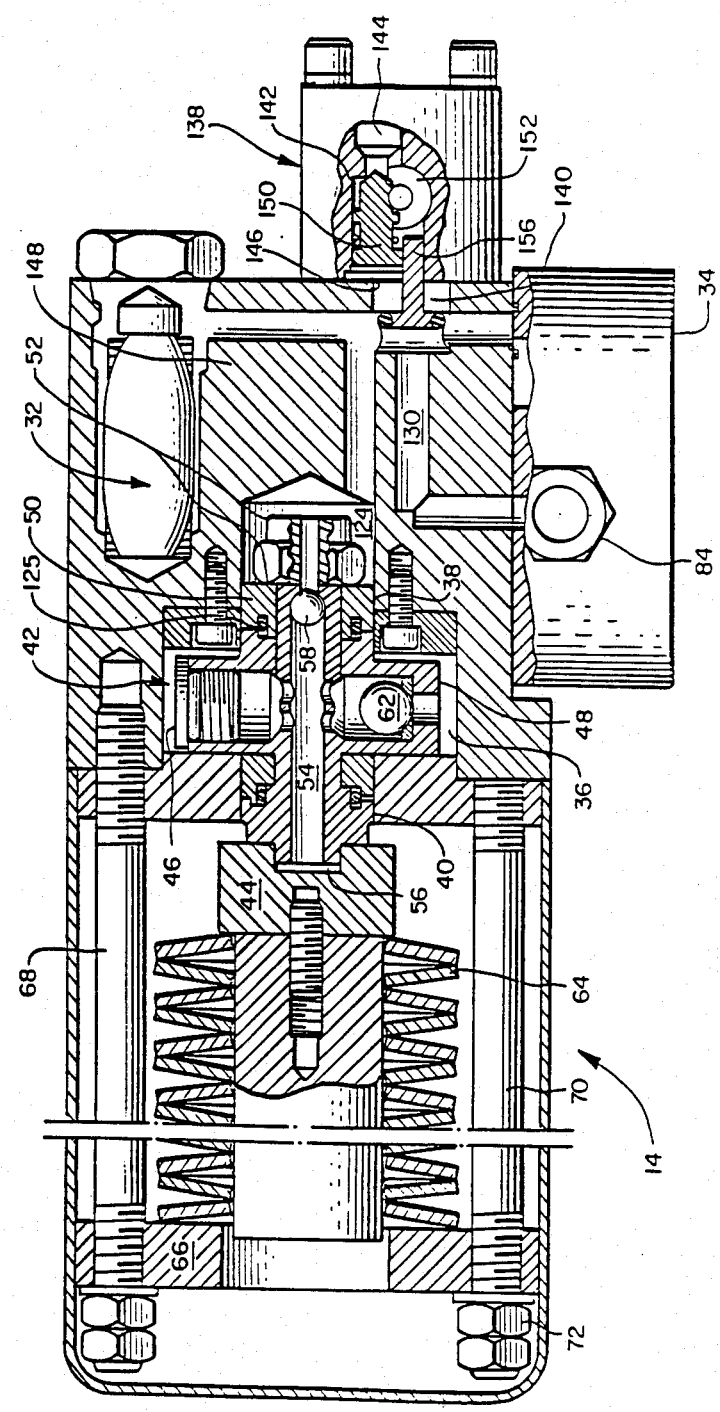
FIG. 5 is a section view of a commercial embodiment of the pilot valve of the invention along the lines 5—5 of FIG. 6, essentially showing functional elements of the valve depicted in FIGS. 1, 1-1', 2, and 2-2'.
Figure 6:
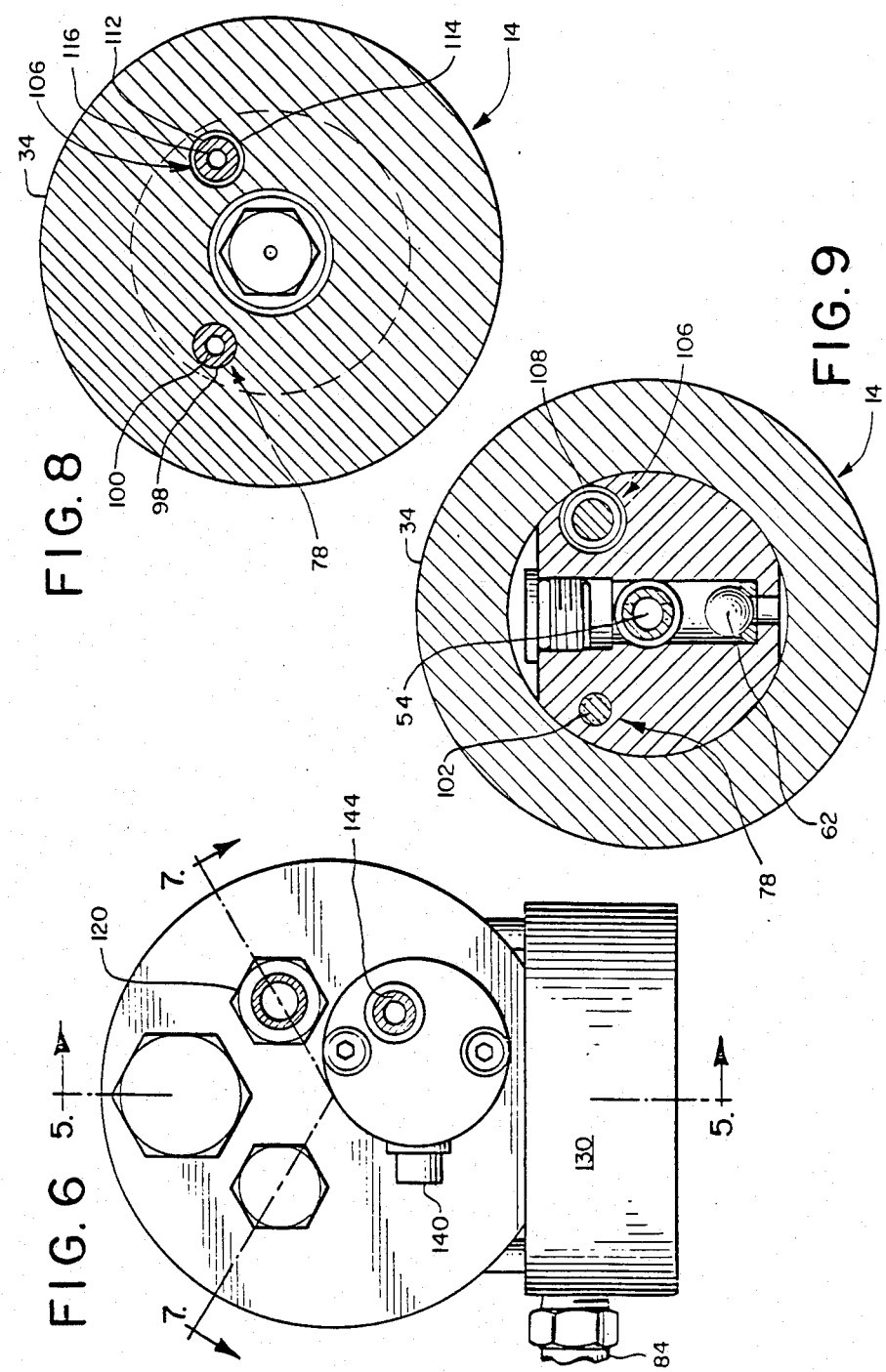
FIG. 6 is an end view of a commercial embodiment of the pilot valve of the invention.
Figure 7:
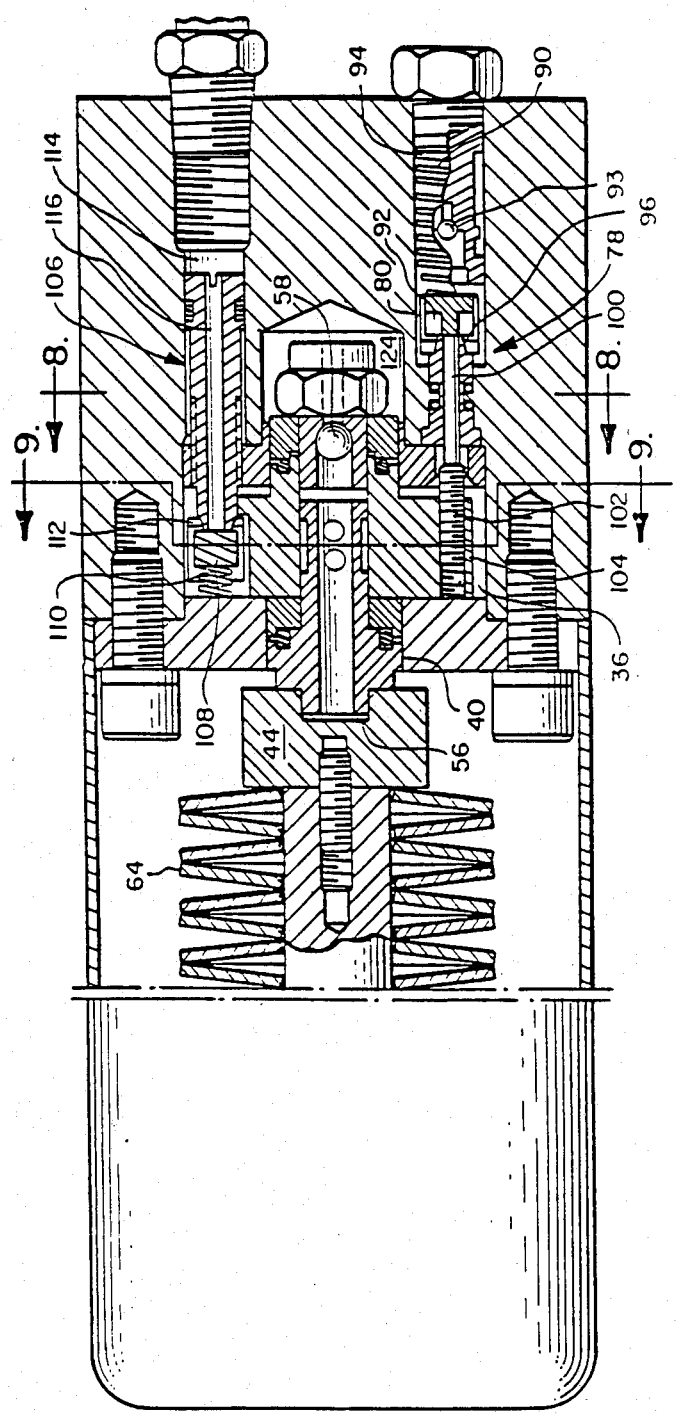
FIG. 7 is a semi-sectional view of a commercial embodiment of the valve described in FIGS. 1 and 2, taken along the lines 7—7 of FIG. 6.

Referring to FIG. 1, there is illustrated a valve assembly generally designated by the reference numeral 10. The valve assembly 10 includes a main valve generally designated by the reference numeral 12 and a pressure operated pilot relief valve generally designated by the reference numeral 14. The pilot valve 14 controls the main valve 12 for modulating proportional venting of product pressure from a pressure vessel.

The main valve 12 includes a body 16 with an inlet 18 that is in fluid communication with a pressure vessel (not shown) containing product fluid under pressure. The main valve 12 also includes an outlet 20 for venting product pressure to the atmosphere or to an overflow vessel. Between the inlet 18 and outlet 20 of the main valve 12 there is a valve seat 22 on which is seated, in the closed position, a movable valve closure member 24. The closure member 24 includes a seal 26 in engagement with a chamber wall 28 extending down from a top 30 of the main valve 12. The seal 26 allows reciprocal movement of the closure element 24 relative to the seat 22. A main head volume 32 is defined within the chamber wall 28 and above the closure element 24. Pressure in the volume 32 biases the closure element 24 into engagement with the seat 22. If the pressure in the main head volume 32 is substantially less than product pressure, the product pressure in inlet 18 moves the closure element 24 upward allowing product to flow from the inlet 18 through the outlet 20.

The pilot valve 14 includes a body 34 defining an enlarged chamber 36 and a reduced diameter chamber 38. An aperture 40 is fabricated in the body 34 through which extends a differential area pilot piston 42 that includes a head 44, a first transverse surface 46, a second transverse surface 48 and a reduced body portion 50 with an end 52. A spring 64 provides pressure opposing or calibration force to the head 44 and piston 42. Varying the compression of spring 64 through the use of adjusting members 70, 66, 68, and 72, allows setting the pressure relief level or pressure value which when admitting to the chamber 124, causes the piston 42 to move to the left (ref. FIG. 1.).

The reduced body portion 50 extends from end 52 to a first side of the surfaces 46 and 48. The pilot valve 10 includes a reduced diameter chamber 124. A seal 125 isolates chamber 124 from chamber 36. Piston 42 extends through bore 40 to the outside and through the bore 38 to chamber 124.

In the modulating version of the valve 10 illustrated in FIG. 1 and FIG. 1-1', the bore 40 is of a larger diameter than bore 38 with the result that the pressure in chamber 36 acts on an annular additional net effective area Δ A producing a leftward force opposing the force of spring 64. Δ A is also the difference between the cross sectional area of end 52 (equal to approximately the cross sectional area of bore 38) and the cross sectional area of the piston 42 where it passes through the bore 40. The difference between the cross sectional areas of the right and left sides of surfaces 46 and 48 is also equal to Δ A, as shown in FIG. 1—1 Prime.

An elongated passage 54 extends the length of the pilot piston 42 to an enlarged void or open area 56 behind the head 44. A back flow preventer or check valve 58 is positioned within the passage 54 to control back flow therethrough. A second passage 60 extends perpendicular to and is in communication with the passage 54 and the chamber 36. A back flow preventer or check valve 62 is positioned within the passage 60 to prevent back flow into the chamber 36 and to maintain product pressure in chamber 54. The piston 42 is biased by a spring 64 positioned between head 44 and a spring plate 66 mounted on threaded supports 68 and 70. The plate 66 is held on the threaded posts 68 and 70 by nuts 72 that adjust the position of the plate 66 and the biasing force of spring 64.

Pressure within the head volume 32 is controlled or modulated by the pilot valve 10 by communicating the pressure in the head volume 32 to the chamber 36 by valve passage 74 and an interconnecting conduit 76. Pilot piston 42 actuates two additional valves to control the fluid pressure within chamber 36. The first valve is an inlet valve generally designated by the reference numeral 78. Inlet valve 78 includes a chamber 80 in communication with product pressure through: a ram tube 82 in the inlet 18 of the main valve 12, a conduit 84, passages 130, 128, 90, and a back flow check valve 93. The back flow check valve 93 is positioned within the discharge passage 90 of the inlet valve 78 so as to prevent flow through 90 when the pressure in chamber 80 exceeds that of passage 90. Inlet valve 78 also includes a valve member 92 that is biased by a spring 94 into engagement with a seat 96. The seat 96 includes a passage 98 extending between chambers 80 and 36. A valve cam 100 extends through the passage 98 and abuts the valve member 92. An adjustable cam actuator 102 is threadably mounted within a threaded aperture 104 in the extending portion 48 of the pilot piston 42. By threading actuator 102, the point of engagement with cam 100 can be adjusted to vary the point at which the valve member 92 is lifted off of the seat 96 by the actuator 100.

The second valve included in the pilot valve 10 is a vent valve generally designated by the reference numeral 106. Vent valve 106 includes a valve member 108 mounted within chamber 36 and biased by a spring 110 into engagement with a seat 112. The seat 112 is threadably mounted within and at one end of bore or passage 114. Seat 112 includes an axial or elongated passage 116. The seat 112 also extends through surface extension 46 of the pilot piston 42. Passage 114 is in fluid communication with outlet 20 of main valve 12 by a conduit 120 that is in fluid communication with an aperture 122 in the outlet 20. Upon engagement of the piston surface or extension 46 with valve member 108, member 108 is unseated and pressure within chamber 36 vents along passage 114, conduit 120, port 122, and through outlet 20.

Forces counterbalancing the biasing force of the pressure calibrating spring 64 are provided by the net force developed by pressure in chamber 36 acting against the effective area Δ A, and product pressure in chamber 124 acting against end 52 of piston 42. It should be noted that if Δ A represents the increased effective pressure sensing area of piston 42 within chamber 36 over the area of surface 52, this force will oppose spring 64 (ref. FIG. 1-1'). If Δ A represents the net effective decrease of the effective pressure sensing area of piston 42 within chamber 36, with respect to the area of surface 52, this force will aid the force of spring 64 (ref. FIG. 2-2').

Chamber 124 is in fluid communication with inlet 18 of the main valve 12 by passages 126, 128, 130, and 84. Product pressure is exerted within passage 54 and on the enlarged void or area 56. As a safety precaution, structure is provided for emergency venting of product pressure if pilot valve 14 fails while preventing relief of head volume 32. If the pilot piston 42 were constricted in its movement at its preset pressure, back flow preventer 58 would open and product pressure entering chamber 124 would flow along the passage 54 into the area 56. Check valve 62 prevents venting of the product pressure within passage 54 into the chamber 36. A seal 134 encircles area 56. As area 56 may be up to 10% smaller than the area of bore 40, before pressure has risen to 10% over set point, head 44 separates from piston 42 allowing pressure to act against the entire area of head 44, which is much larger than area 56, causing further lift and full opening of passage 54. Pressure in chamber 32 is then vented through passages 74 and 60 into chamber 36, across check valve 62, past head 44 to the atmosphere. Piston 24 then lifts, venting the overpressure through outlet 20 in the usual manner. Valve 62 functions as a check valve so the pressure in chamber 32 is not replenished by inlet pressure from chamber 124 via passage 54. Adjustment of the force in spring 64 determines both the set point of the pilot and the relief pop off pressure of this emergency backup device.

In operation, with the modulating version of FIG. 1, and FIG. 1-1', the main valve 12 is initially balanced with valve closure member 24 on seat 22 and inlet valve 78 and vent valve 106 closed. As product pressure in the inlet 18 increases, pressure is communicated from the inlet 18 of the main valve 12 to end 52 of the pilot piston 42. Once product pressure increases to a preselected level, pilot piston 42, biased by pressure in chambers 36 and 124, moves against the spring 64. This movement results first in allowing valve member 92 to close against seat 96 cutting off pressure supply to chamber 36 and then results in engagement of portion 46 of pilot piston 42 against valve member 108 lifting it off seat 112 and allowing pressure within chamber 36 to vent through vent valve 106 to outlet 20 of the main valve 12. Pressure in head volume 32 is also vented reducing the pressure acting on the effective pressure sensing area Δ A (ref. FIG. 1-1') thereby reducing the force acting against spring 64 which had moved the differential piston leftward. The force of spring 64 is then sufficient to move pilot piston 42 toward its original position closing vent valve 106. During this cycle, the reduction in pressure in chambers 36 and 32 allows the main valve closure member 24 to lift slightly off seat 22 allowing product to flow from inlet 18 through outlet 20; however, no product flows through pilot valve 14. If closure member 24 is not lifted a sufficient amount to vent product pressure, and product pressure continues to rise, the cycling of the pilot piston 42 is repeated. This corresponds to a non-bleed operation and provides modulating or proportional venting of product pressure.

With product pressure below the pilot set point pressure, spring 64 moves pilot piston 42 moving actuator 102 into engagement with the valve cam 100. Cam 100 lifts inlet valve member 92 off seat 96 allowing product pressure into chamber 36. The increased pressure in chamber 36 increase the net force acting on the effective pressure sensing area Δ A to move actuator 102 off cam 100 closing inlet valve 78. The increased pressure in chamber 36 is communicated to head volume 32 biasing closure element 24 slightly downward 22 to reduce flow through the inlet 18 and outlet 20 of the main valve 12. If the flow is not sufficiently reduced, the cycle is repeated.

During either of the described cycles, only product pressure in the head volume 32 is vented. A large volume of product does not flow through the pilot valve 14 and continuous venting of product pressure does not occur thereby avoiding the flow of contaminants into the pilot valve 14 that could damage or impede operation.

A position intermediate of the described positions of pilot piston 42 is illustrated in FIG. 1. In the intermediate position, inlet valve 80 and vent valve 106 are closed resulting in a stabilizing dead band that isolates the pressure in the head volume 32 and the product pressure providing improved control of main valve closure element 24 in proportional relief operation.

Valve assembly 10 also includes a field test limit valve generally designated by the reference numeral 138. Field test valve 138 includes an inlet 140 into which is introduced test pressure. A chamber 142 is defined within the field test valve 138 and is in fluid communication with inlet 140 and a vent 144. An outlet 146 in chamber 142 communicates with a passage 148 extending into chamber 36. This communication allows a poppet valve 150 to sense pressure in head volume 32. The poppet valve 150 with an extension 151 is reciprocally mounted within the chamber between the outlet 146, the inlet 140 and the vent 144. Chamber 142 is also in communication with a passage 152 than includes an outlet 154 in communication with passage 130. A shuttle valve 156 is positioned within the outlet 154.

The extension 151 on the poppet valve 150 can be sealed against vent 144 as illustrated if pressure in the volume 32 and chamber 36 is greater than atmospheric pressure. While the poppet valve 150 is in this position, shuttle valve 156 senses field test fluid pressure introduced into the inlet 140 and product pressure in passage 130. To test the pilot valve 14, field test pressure is introduced into inlet 140. If the test pressure is less than the pressure in volume 32, shuttle valve 156 is seated in outlet 154 and the poppet valve 150 is seated in vent 144 to retain head pressure in volume 32 and the pressure in chamber 36 near product pressure. As test pressure is increased and approaches product pressure, shuttle valve 156 is lifted from the outlet 154 to isolate the field test valve 138 from product pressure. Field test pressure may then enter chamber 36 by way of the inlet valve 78 since the differential piston 42 is below set relief pressure and moved to the right of its position shown on FIG. 1, wherein inlet valve cam 100 and actuator 102 open valve member 92, admitting test fluid at test pressure to chamber 36, and elevating head pressure in volume 32 to field test pressure. As field test pressure continues to increase and approach the set point pressure, the pilot piston 42 moves to the left (ref. FIG. 1) to close the inlet valve 78 and open the vent valve 106 allowing the head pressure within volume 32 to drop. As the head pressure drops to approximately 80% of the field test pressure being introduced into inlet 140, poppet valve 150 moves off the vent 144 venting the field test pressure to atmosphere. The 80% figure is dependent on effective pressure areas of poppet 150, other values could be incorporated as well. The pilot piston 42 then returns to its original position closing the inlet valve and raising pressure in the head volume 32 prior to the main valve 12 opening. The field test limit valve 138 allows an inspector to check the operation of the pilot valve 14 without main valve operation, but if the main valve operation is desired, vent 144 may be plugged or otherwise obstructed.

If pressure in the main valve outlet 20 exceeds pressure in its inlet 18, piston or closure element 24 due to effective pressure areas adjacent the seat 22 will lift allowing backflow from the outlet 20 to the inlet 18 into the tank unless the inlet pressure that the pilot usually communicates to chamber 32 is replaced by the higher outlet pressure. Under these conditions, pressure in outlet 20 flows back through outlet port 122, passages 120 and 114, lifts poppet 108, flows through chamber 36 and passage 74 into chamber 32 while check valves 93 and 58 prevent the higher pressure in chamber 36 from flowing back to the tank through inlet 84.

A "pop" or rapidly acting, full discharge pilot operated relief valve designated 10' is illustrated in FIGS. 2 and 2-2'. The pop valve 10' is substantially the same as the modulating valve 10 and identical components of pop valve 10' are designated by the same reference numeral as in FIG. 1 whereas different components are designated by the same reference numeral and a prime. The differential area Δ A' in the pop valve 10' is the reverse of the modulating valve 10 since the bore 40' is of a smaller diameter than bore 38 with the result that the pressure in chamber 36 acting on differential area Δ A' produces a net rightward force. This force then aids the force of spring 64 and opposes the force due to tank pressure on area 52. As the tank pressure rises to setpoint, piston 42 moves left acting to reduce pressure in chamber 36 which reduces the rightward force due to this pressure on area Δ A' permitting further left motion of piston 42. This regenerative or positive feedback action quickly drives piston 42 full left venting all pressure from chamber 32 fully opening main valve 12. This action of the valve 10' is described as a "pop" action or rapid acting, full discharge action.

Therefore I claim:

1. A pilot valve for sensing product pressure communicated to an inlet of a main valve and venting said product pressure at pressure levels above a predetermined level, said main valve including an inlet and outlet and a main valve piston reciprocally mounted in said main valve engaging said main valve inlet at a predetermined set point pressure, said main valve further including a head volume on a side of said main valve piston opposite said main valve inlet, said pilot valve comprising:
   a pilot valve body;
   said pilot valve body including a pilot chamber and a reduced diameter chamber communicating with said pilot chamber;
   a compound differential area pilot piston with a transverse surface extending within said pilot chamber and a reduced body portion extending into said reduced diameter chamber for reciprocal movement therein, said pilot piston reduced body portion including an end defining a pressure surface, said pressure surface and said reduced diameter chamber defining a pressure chamber;
   first passage means for communicating said pilot chamber and said head volume;
   second passage means for communicating said pilot chamber with said outlet of said main valve;
   third passage means for communicating said pressure chamber with said inlet of said main valve;
   first valve means for controlling fluid flow through said second passage means, said first valve means in a closed position in a balanced mode of the main valve and actuable by said pilot piston to an open position upon movement by said pilot piston a distance proportional to a predetermined increase in product pressure;
   second valve means for controlling fluid flow through said third passage means, said second valve means in an open position in the balanced mode of the main valve and actuable by said pilot piston to a closed position prior to opening of said first valve means upon movement by said pilot piston said distance proportional to said predetermined increase in product pressure, whereby said pilot chamber is isolated from said inlet chamber followed by venting of said pilot chamber; and
   biasing means for biasing said pilot piston out of engagement with said first valve means and into engagement with said second valve means, whereby upon venting said pilot chamber, said biasing means returns said pilot piston to the balanced mode position.

2. The pilot valve set forth in claim 1 further comprising an aperture in said pilot valve body, said pilot piston partially extending through said aperture, said biasing means engaging the portion of said pilot piston extending through said aperture.

3. The pilot valve set forth in claim 2 wherein the ratio of the cross-sectional area of said portion of said pilot piston extending through said aperture to the cross-sectional area of said end of said reduced body portion of said compound differential area pilot piston is greater than unity.

4. The pilot valve set forth in claim 2 wherein the ratio of the cross-sectional area of said portion of said pilot piston extending through said aperture to the cross-sectional area of said end of said reduced body portion of said compound differential area pilot piston is less than unity.

5. In combination;
   a main valve including;
   a main valve body;
   an inlet and outlet in said main valve body;
   a main valve chamber; and
   a main valve closure member in said main valve chamber;
   means mounting said main valve closure member in said main valve chamber for reciprocal motion therein, said main valve closure member engaging said main valve outlet for controlling fluid flow therethrough, said mounting means defining a main valve chamber above said main valve closure member; and
   a pilot valve for positioning said main valve closure member for predetermined positions relative said main valve outlet, said positions providing modulation of fluid flow through said main valve, including a pilot valve body comprising;

a first piston chamber in said pilot valve body, said first piston chamber defining a wall;

an aperture in said wall; and a compound differential area pilot piston in said pilot valve body comprising;

a first essentially circular pilot piston end having a first diameter in said first piston chamber, said first pilot piston end in sliding engagement and projecting through said aperture in said wall;

a second essentially circular pilot piston end, having a second diameter, the ratio of said first diameter to said second diameter maintained at a fixed ratio, said second pilot piston end in sliding engagement with, and projecting from said first piston chamber into said pilot valve body, thereby defining a second pilot piston chamber adjacent said second pilot piston end;

means fluid communicating said first pilot chamber and said main valve chamber;

first passage means in said pilot valve body, said first passage means fluid communicating said second pilot piston chamber and said main valve inlet;

first valve means in said first passage means actuated by said pilot piston for a first pilot piston position, for controlling flow therethrough;

second passage means in said pilot valve body, said second passage means fluid communicating said first pilot chamber and main valve outlet;

second valve means in said second passage means actuated by said pilot piston for a second pilot piston position, for controlling flow therethrough;

whereby pilot piston motion from said first pilot piston position to said second pilot piston position provides independent valve operation of said first and second valve means, said independent valve operation providing fluid isolation of said first piston chamber for pilot piston positions intermediate said first and second pilot piston positions.

6. The pilot piston of claim 5 wherein said ratio of said first diameter to said second diameter is greater than unity.

7. The pilot piston of claim 5 wherein said ratio of said first diameter to said second diameter is less than unity.

* * * * *